United States Patent Office 3,798,233
Patented Mar. 19, 1974

3,798,233
3-HALOPHENYL DERIVATIVES OF THIOHYDANTOINS
Keiichiro Akiba, Ikeda, Akira Fujinami, Ashiya, Akihiko Mine, Toyonaka, Takeo Satomi, Takarazuka, and Naganori Hino, Toyonaka, Japan, assignors to Sumitomo Chemical Company, Limited, Osaka, Japan
No Drawing. Filed Jan. 15, 1971, Ser. No. 106,909
Claims priority, application Japan, Jan. 21, 1970, 45/5,955
Int. Cl. C07d 49/32
U.S. Cl. 260—309.5    5 Claims

ABSTRACT OF THE DISCLOSURE

A thiohydantoin derivative having the formula,

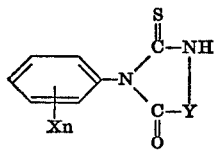

wherein X is a halogen atom, $n$ is an integer of 1 to 3, and Y is

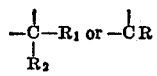

in which $R_1$ and $R_2$ each are hydrogen atom, an alkyl, a hydroxyalkyl, an alkenyl, an alkoxycarbonyl or an alkoxycarbonylalkyl group, and R is an alkylidene or an alkoxycarbonylalkylidene group, which may be useful as herbicides.

---

This invention relates to a novel thiohydantoin derivative having the formula,

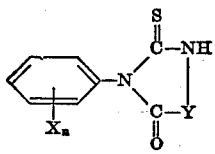
(A)

wherein X is a halogen atom, $n$ is an integer of 1 to 3, and Y is

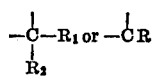

in which $R_1$ and $R_2$ each are hydrogen atom, an alkyl, a hydroxyalkyl, an alkenyl, an alkoxycarbonyl or an alkoxycarbonylalkyl group, and R is an alkylidene or an alkoxycarbonylalkylidene group, a process for preparing the same and a herbicidal composition containing the same.

(a) More particularly, the invention pertains to:
(a) A thiohydantoin derivative having the general Formula I,

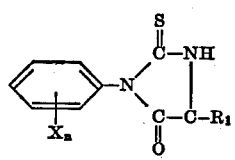

wherein X, $n$, $R_1$ and $R_2$ are as defined above, or the General Formula I',

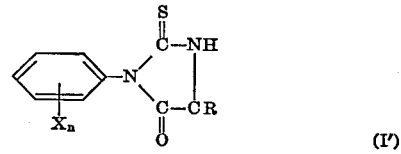
(I')

wherein X, $n$ and R are as defined above. In the present invention the "alkyl" and "alkylidene" mean an alkyl and alkylidene having 1 to 4 carbon atoms.

(b) A process for preparing thiohydantoin derivatives having the Formula I or I', which comprises (1) reacting a phenyl isothiocyanate derivative having the formula,

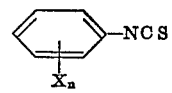
(II)

wherein X and $n$ are as defined above, with an amino acid derivative having the formula,

(III)

wherein $R_1$ and $R_2$ are as defined above, to obtain thiohydantoin derivatives of the Formula I, or 2 reacting a thiohydantoin derivative having the formula,

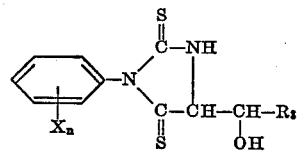
(IV)

wherein $R_3$ is hydrogen atom or an alkyl group, and X and $n$ are as defined above, with an aqueous solution of an alkali hydroxide, to obtain thiohydantoin derivatives of the Formula I' or 3 reacting a thiohydantoin derivative having the formula,

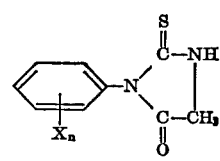
(V)

wherein X and $n$ are as defined above, with an aldehyde derivative having the formula,

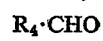

$R_4 \cdot CHO$     (VI)

wherein $R_4$ is an alkyl group, to obtain thiohydantoin derivatives of the Formula I', or 4 reacting a phenylthiourea derivative having the formula,

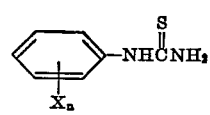
(VII)

wherein X and n are as defined above, with a carbonyl diester derivative having the formula,

(VIII)

wherein each $R_5$ and $R_6$ is an alkyl group, and $m$ is an integer of 1 to 3, to obtain thiohydantoin derivatives of the Formula I'.

(c) A herbicidal composition containing an inert carrier and a herbicidal amount of at least one thiohydantoin derivative having the Formula I or I'.

The present inventors synthesized various thiohydantoin compounds and investigated the herbicidal activities thereof. As the result, the inventors have attained such a surprising knowledge that the thiohydantoin derivatives of the Formula I and I' display more effective and broader herbicidal activities, compared with those of other analogous compounds disclosed in, for example, C. A., vol. 57, 12470c, C. A., vol. 69, 19080, and Belgian Pat. No. 62,979 (1963).

When subjected to pre-emergence treatment of weeds, the thiohydantoin compounds synthesized in the above manner by the present inventors display strong herbicidal activities against a wide scope of weeds such as, for example, barnyardgrass (*Echinochloa crus-galli*), slender spikerush (*Eleocharis acicularis*), nutsedge sp. (*Cyperus difformis*), monochoria (*Monochoria viaginalis Presl.*) false pimpernel (*Linderna pyxidaria* L.), toothcup (*Rotala indica* Koehne), elatine sp. (*Elatine orientaris*), etc., and can effectively control grass family weeds and broad-leaved weeds.

More surprisingly, the compounds of the present invention can successfully control the aforesaid weeds of various kinds without showing any phytotoxicity not only to transplanted rice seedlings but also to directly-sowed rice plants. Therefore, the present compounds are quite excellent as herbicides for paddy rice fields. Further, when applied to upland fields, the present compounds have strong herbicidal activities on many weeds, e.g. grass family weeds such as crabgrass (*Digitaria sanguinalis*), foxtail (*Alopecurus aequalis*) and barnyardgrass (*Echinochloa crus-galli*), and such weeds as common purslane (*Portulaca oleracea*), polygonum sp. (*Polygonum longisetum*), chickweed (*Stellaria media*), pigweed sp. (*Amaranthus retroflexus*), milk purslane (*Euphorbia supina*) and nutsedge sp. (*Cyperus microiria*), and may be applied to cereals, beans and vegetables, orchards, turfs, pasture lands and non-crop lands.

The present compounds are extremely low in toxicity to mammals and fishes.

The present invention will be illustrated in more detail.
The process (1) is carried out as follows.

An alcohol solution of a phenylisothiocyanate derivative of the Formula II is added to an alkali salt of an amino acid of the Formula III which is formed by adding to the amino acid an eguimolar amount of an alkali hydroxide in the form of a solution in a small amount of water. Thereafter, the resulting mixture is heated at 80° to 90° C. for about 1 hour, and then the solvent is removed. The residue is acidified by addition of dilute hydrochloric acid, and then allowed to stand for a while to deposit crystals. The crystals are recovered by filtration and then recrystallized from ethanol to obtain a desired compound of the Formula I. In the case of use of a hydroxyamino acid (any one of $R_1$ and $R_2$ is hydrogen atom and the other a hydroxyalkyl in the Formula III), there may be adopted such procedures that an aqueous solution of the hydroxyamino acid and an alkali hydroxide is mixed with an alcohol solution of the phenyl isothiocyanate (II), and the resulting mixed solution is thoroughly stirred at room temperature, charged with acetic acid and hydrochloric acid, heated to homogeneity and then cooled to obtain crystals.

The process (2) is carried out in the following manner:
A thiohydantoin of the Formula IV is suspended with an aqueous alkali hydroxide solution, and the suspension is sufficiently stirred and thereafter acidified with acetic acid to obtain crystals having the Formula I', more concretely the formula,

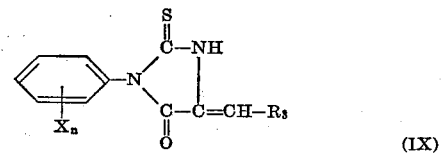
(IX)

wherein X and $n$ are as defined above and $R_3$ is hydrogen atom or an alkyl group.

The process (3) is carried out in the following manner:
An acetic anhydride solution of a thiohydantoin of the Formula V and an aldehyde derivative of the Formula VI is incorporated with sodium acetate. The resulting mixture is heated for about 3 hours, cooled and then allowed to stand in water to obtain crystals having the Formula I' more concretely the formula.

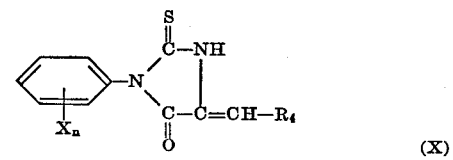
(X)

wherein $R_4$, X and $n$ are as defined above.

The process (4) is carried out in the following manner:
A halogenated phenylthiourea of the Formula VII is reacted in acetic acid with a carbonyl diester derivative of the Formula VIII, while introducing dry hydrogen chloride. Subsequently, the reaction product is allowed to stand at a low temperature to obtain a thiohydantoin derivative of the Formula I', more concretely the formula,

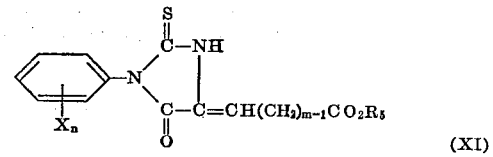
(XI)

wherein X, $R_5$, $m$ and $n$ are as defined above.
Several examples of starting materials used for preparing the present compounds are shown below.
Phenyl isothiocyanate derivatives (II):

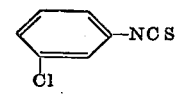

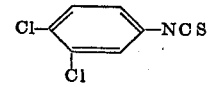

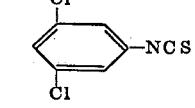

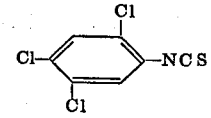

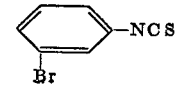

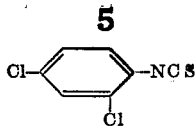
Amino acid (III), aldehyde (VI) and carbonyl diester (VIII) derivatives:
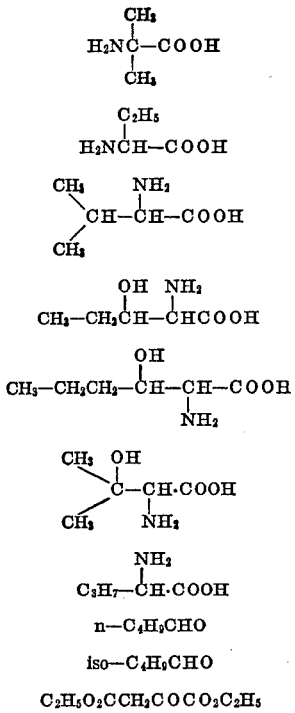
n—$C_4H_9CHO$
iso—$C_4H_9CHO$
$C_2H_5O_2CCH_2COCO_2C_2H_5$
Examples of typical thiohydantoin derivatives belonging to the present invention are enumerated below.
| Compound number | Chemical structure | M.P., °C. |
|---|---|---|
| (1) | | 177.0–178.0 |
| (2) | | 168.0–169.0 |
| (3) | | 172.0–174.5 |
| (4) | | 183.0–184.0 |
| (5) | | 177–178.5 |
| (6) | | [1] 212.5 |
| (7) | | [1] 223.0 |
| (8) | | [1] 215.0 |
| (9) | | [1] 224.0 |
| (10) | | 219.5–221.5 |
| (11) | | 213.0–215.0 |
| (12) | | [1] 174 |
| (13) | | 237.5–238.5 |
| (14) | | 195.5–197.5 |
| (15) | | 251.0–253.0 |
| (16) | | 177–179 |
See footnotes at end of table.

TABLE—Continued

| Compound number | Chemical structure | M.P., °C. |
|---|---|---|
| (17) | [structure: 2,4-dichlorophenyl-N with C(=S)-NH and C(=CH-CO₂Et)-C=O ring] | 226.0–228.0 |
| (18) | [structure: 2,4-dichlorophenyl ring with C=CH-CH₃] | 254.0–256.0 |
| (19) | [structure: 2,4-dichlorophenyl ring with C=CH-C₃H₇-n] | 269.0–271.5 |
| (20) | [structure: 2,4-dichlorophenyl ring with C=CH-C₃H₇-iso] | 274.5–275.5 |
| (21) | [structure: 3,2-dichlorophenyl ring with C-C(CH₃)(CH₃)] | 192.5–195.4 |
| (22) | [structure: 2,4-dichlorophenyl ring with C-CH₂] | 233–235 |
| (23) | [structure: 3,4-dichlorophenyl ring with C-C(CH₃)(CH₃)] | 205–206.5 |
| (24) | [structure: 3,4-dichlorophenyl ring with C-C-CH₃] | 223.5–225.0 |
| (25) | [structure: 3,4-dichlorophenyl ring with C-CH-CH-CH₃ and OH] | 231–232.0 |
| (26) | [structure: 3,4-dichlorophenyl ring with C=CHCH₃] | 260–262.0 |
| (27) | [structure: 3-chlorophenyl ring with CHCH=CH₂] | 201–203.5 |

[1] Decomposition.

In actual application, the thus obtained compounds of the present invention may be used as they are or may be used in the form of any of such preparations as granules, dusts, wettable powders and emulsifiable concentrates. These preparations are desirably used so as to conform to the kinds and sizes of crops and to the purposes of application.

In formulating the present compounds, there are used such solid carriers as, for example, talc, bentonite, clay, kaolin, diatomaceous earth and vermiculite; such liquid carriers as, for example, benzene, alcohols, acetone, xylene, dioxane, methyl naphthalene and cyclohexanone; and such emulsifiers as, for example, alkyl sulfate esters, alkyl sulfonates, aryl sulfonates, polyethylene glycol ethers and polyhydric alcohol esters. In actual application, the present compounds may be enhanced and ensured in effectiveness by using them in admixture with surface active agents such as spreaders and stickers and the like. It is also possible to use the present compounds in admixture with fungicides, insecticides, nematocides, other herbicides and the like agricultural chemicals and with fertilizers.

The present invention is illustrated in further detail below with reference to examples, but it is needless to say that the kinds of starting materials for the present compounds, the reaction conditions, and the kinds and proportions of additives incorporated into the present compounds are not limited only to those shown in the examples but are variable over wide scopes. In the examples, all parts are by weight.

EXAMPLE 1

Wettable powder 50 parts of the compound (10), 5 parts of a wetting agent of the alkylbenzenesulfonate type and 45 parts of diatomaceous earth were thoroughly pulverized and mixed together to obtain a wettable powder.

EXAMPLE 2

Dust 7 parts of the compound (3) and 93 parts of clay were thoroughly pulverized and mixed together to obtain a dust.

EXAMPLE 3

Granule 8 parts of the compound (11), 35 parts of bentonite, 52 parts of clay and 5 parts of sodium lignosulfonate were thoroughly pulverized and mixed together. The resulting mixture was sufficiently kneaded with water, and then granulated and dried to obtain a granule.

EXAMPLE 4

Emulsifiable concentrate 20 parts of the compound (1), 15 parts of an emulsifier of the polyoxyethylene glycol ether type and 65 parts of cyclohexanone were thoroughly mixed together to obtain an emulsifiable concentrate.

EXAMPLE 5

3.1 grams of dl-aminoisobutyric acid was charged into a 100 ml. four-necked flask. To the flask was added a solution of 1.2 g. of caustic soda in 10 ml. of water, and the resulting mixture was stirred to obtain a sodium salt of amino acid. Into this sodium salt was dropped with stirring at room temperature a solution of 5.4 g. of m-chlorophenyl isothiocyanate in 40 ml. of alcohol. After completion of the dropping, the resulting mixture was heated with reflux for about 1 hour, cooled, freed from the solvent and then acidified with dilute hydrochloric acid to deposit crystals. The crystals were recovered by filtration and then recrystallized from ethanol-water to obtain the present compound (1), yield 87%, M.P. 177.0–178° C.

*Elementary analysis.*—Calculated (percent): C, 51.86; H, 4.35; N, 11.00; S, 12.59; Cl, 13.92. Found (percent): C, 51.89; H, 4.32; N, 11.08; S, 12.25; Cl, 14.18.

In the same manner as above, the present compounds (2), (3), (4), (5), (11), (21), (22), (23), (24) and (27) were obtained.

EXAMPLE 6

Into a solution of 3.6 g. of threonine and 1.6 g. of potassium hydroxide in 10 cc. of water was dropped at room temperature over a period of about 10 minutes a solution of 6.1 g. of 3,5-dichlorophenyl isothiocyanate in 75 cc. of ethanol. The mixed solution was stirred at room temperature for 2 hours, charged with 100 cc. of glacial acetic acid and 15 cc. of concentrated hydrochloric acid, heated until the solution became homogeneous and then cooled with ice to deposit crystals. The crystals were recovered by filtration and then recrystallized from ethanol to obtain the present compound (10), yield 74%, M.P. 219.5–221.5° C.

Elementary analysis.—Calculated (percent): C, 43.29; H, 3.30; N, 9.18; S, 10.51; Cl, 23.24. Found (percent): C, 42.95; H, 2.98; N, 8.90; S, 10.83; Cl, 23.17.

In the same manner as above, the present compounds (6), (7), (8), (9), (12) and (25) were obtained.

EXAMPLE 7

3-(3',5'-dichlorophenyl) - 5 - α - hydroxyethylthiohydantoin synthesized from threonine was gradually added to an aqueous 1 N-caustic soda solution. When the solution, which had been colorless, became pink and then yellow, the solution was acidified by addition of acetic acid, and then stirred for 30 minutes to deposit crystals. The crystals were recovered by filtration and then recrystallized from an aqueous ethanol solution to obtain the present compound (18), yield 80%, M.P. 254.0–256.0° C.

Elementary analysis.—Calculated (percent): C, 46.01; H, 2.81; N, 9.76; S, 11.17; Cl, 24.69. Found (percent): C, 45.87; H, 2.65; N, 9.54; S, 10.93; Cl, 24.74.

EXAMPLE 8

To a solution of 6.5 g. of 3-(3',5'-dichlorophenyl)-2-thiohydantoin and 1.8 g. of n-butylaldehyde in 30 cc. of acetic anhydride was added 6 g. of sodium acetate, and the resulting mixture was refluxed with stirring for 3 hours and then cooled. Subsequently, the mixture was poured into 200 cc. of water and then allowed to stand with occasional stirring to deposit crystals. The crystals were recovered by filtration and then recrystallized from acetic acid to obtain the present compound (19), yield 58%, M.P. 269.0–271.5° C.

Elementary analysis.—Calculated (percent): C, 49.53; H, 3.84; N, 8.89; S, 10.17; Cl, 22.50. Found (percent): C, 49.78; H, 3.60; N, 9.11; S, 9.85; Cl, 22.64.

In the same manner as above, the present compound (20) was obtained.

EXAMPLE 9

Into a solution of 6.6 g. of 3,5-dichlorophenylthiourea in 50 cc. of glacial acetic acid was dropped over a period of 10 minutes, while introducing dry hydrogen chloride gas, a solution of 5.6 g. of diethyl oxaloacetate in 20 cc. of glacial acetic acid. After completion of the dropping, dry hydrogen chloride was introduced at room temperature for 30 minutes, and the mixed solution was allowed to stand overnight at 0° C. to deposit crystals. The crystals were recovered by filtration and then recrystallized from ethanol to obtain the present compound (17), yield 77%, M.P. 226.0–228.0° C.

Elementary analysis.—Calculated (percent): C, 45.23; H, 2.92; N, 8.12; S, 9.29; Cl, 20.54. Found (percent): C, 45.40; H, 2.75; N, 7.98; S, 9.12; Cl, 20.18.

In order to sustantiate the prominent effects of the present compounds as herbicides, detailed illustration is made below with reference to typical test examples, in which the names of the compounds are represented by the numbers of the previously exemplified compounds.

TEST EXAMPLE

Pre-emergence application

Seeds of radish, barnyardgrass, cucumber, lamb's quarter and false pimpernel were individually sowed in flower pots. After covering the seeds with soil, test compounds in such amounts as shown in Table 1 were individually applied to the soil. Thereafter, the test plants were grown in a greenhouse and, after 20 days from the application, the herbicidal effects of the individual compounds were investigated to obtain the results as set forth in Table 1. The herbicidal effects were evaluated by the numerals ranging from 0 (not damaged) to 5 (completely killed). All the compounds were formulated into emulsifiable concentrates, and aqueous dilutions thereof were used.

TABLE 1.—HERBICIDAL EFFECTS BY PRE-EMERGENCE APPLICATION

| Name of compound | Amount of active ingredient (g./are) | Herbicidal effect on— | | | | |
|---|---|---|---|---|---|---|
| | | Radish | Barn-yardgrass | Cucumber | Lamb's-quarter | False pimpernel |
| (1) | 100 | 3 | 5 | 1 | 4 | 4 |
| | 50 | 1 | 4 | 0 | 4 | 3 |
| (3) | 100 | 4 | 5 | 3 | 5 | 5 |
| | 50 | 2 | 5 | 1 | 5 | 5 |
| (4) | 100 | 1 | 4 | 2 | 4 | 4 |
| | 50 | 0 | 3 | 0 | 2 | 2 |
| (5) | 100 | 0 | 4 | 0 | 4 | 4 |
| | 50 | 0 | 3 | 0 | 2 | 2 |
| (9) | 200 | 0 | 3 | 0 | 3 | 4 |
| | 100 | 0 | 2 | 0 | 1 | 1 |
| (10) | 200 | 1 | 3 | 0 | 4 | 3 |
| | 100 | 0 | 3 | 0 | 2 | 1 |
| (11) | 100 | 3 | 5 | 3 | 5 | 5 |
| | 50 | 1 | 5 | 0 | 4 | 3 |
| (21) | 200 | 1 | 3 | 1 | 3 | 4 |
| | 100 | 0 | 3 | 0 | 2 | 2 |
| Pentachlorophenol (control) | 100 | 4 | 3 | 3 | 4 | 4 |
| | 50 | 1 | 2 | 2 | 2 | 2 |
| 3-phenyl-5,5-dimethyl-2-thiohydantoin [C.A., 57 12470c] (control) | 200 | 0 | 0 | 0 | 1 | 0 |
| | 100 | 0 | 0 | 0 | 0 | 0 |
| 3-phenyl-5-benzylidene-2-thiohydantoin [C.A., 69 19080] (control) | 200 | 0 | 0 | 0 | 0 | 0 |
| | 100 | 0 | 0 | 0 | 0 | 0 |
| 3-(m-chlorophenyl)-5,5-dimethylhydantoin [C.A. vol. 60, 145121] (control) | 200 | 1 | 0 | 0 | 1 | 1 |
| | 100 | 0 | 0 | 0 | 0 | 0 |

TEST EXAMPLE 2

Wagner pots of 14 cm. in diameter, which had been packed individually with 1.5 kg. of paddy field soil, were brought into the state of paddy fields. To the pots were transplanted rice seedlings at the 3-leaves stage. Further, 5 seeds of rice plants and of barnyardgrass were sowed in the pots and, after covering with soil, the test plants were grown in a greenhouse. On the second day after the sowing, given amounts of test compounds were individually applied to the soil under water logged conditions. Broad-leaved weeds germinated were monochoria, false pimpernel and toothcup. After 25 days, the herbicidal effects and the phytotoxicity thereof to the rice seedlings were investigated to obtain the results as set forth in Table 2. The herbicidal effects and the phytotoxicity were evaluated by numerals ranging from 0 (not damaged) to 5 (completely killed).

4. A compound o fthe formula,

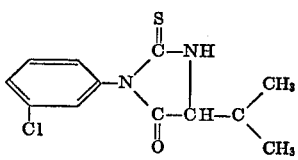

5. A compound of the formula,

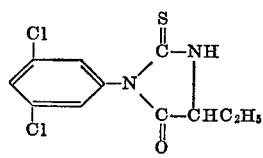

TABLE 2.—HERBICIDAL EFFECTS IN APPLICATION UNDER WATER LOGGED CONDITIONS

| Name of compound | Amount of active ingredient (g./acre) | Herbicidal effect on— | | Phytotoxicity on rice | |
|---|---|---|---|---|---|
| | | Barn-yard-grass | Broad-leaved weeds | Directly sowed rice | Transplanted rice |
| (2) | 50 | 5 | 5 | 3 | 0 |
| | 25 | 5 | 4 | 1 | 0 |
| (3) | 50 | 5 | 5 | 3 | 0 |
| | 25 | 5 | 5 | 1 | 0 |
| (6) | 100 | 5 | 5 | 1 | 0 |
| | 50 | 4 | 3 | 0 | 0 |
| (10) | 50 | 5 | 5 | 0 | 0 |
| | 25 | 5 | 5 | 0 | 0 |
| (15) | 100 | 5 | 4 | 0 | 0 |
| | 50 | 3 | 2 | 0 | 0 |
| (17) | 100 | 4 | 5 | 1 | 0 |
| | 50 | 3 | 3 | 0 | 0 |
| (18) | 50 | 5 | 5 | 0 | 0 |
| | 25 | 5 | 5 | 0 | 0 |
| (19) | 50 | 5 | 5 | 0 | 0 |
| | 25 | 4 | 5 | 0 | 0 |
| Pentachlorophenol (control) | 50 | 4 | 5 | 5 | 3 |
| | 25 | 3 | 5 | 3 | 1 |

What is claimed is:

1. A thiohydantoin derivative having the formula,

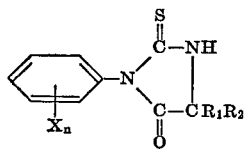

wherein X is a halogen atom, $n$ is an integer of 1 to 3, and $R_1$ and $R_2$ each are hydrogen atom, lower alkyl, hydroxyloweralkyl, and loweralkenyl, with the proviso that $R_1$ and $R_2$ are not simultaneously hydrogen, hydroxyloweralkyl or lower-alkenyl.

2. A compound of the formula,

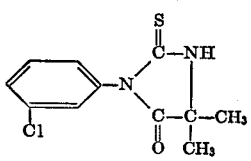

3. A compound of the formula,

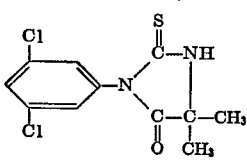

References Cited

UNITED STATES PATENTS

| 3,134,663 | 5/1964 | Kroll | 260—309.5 |
| 3,668,217 | 6/1972 | Fujiinami et al. | 260—309.5 |
| 3,676,456 | 7/1972 | Gruenfeld | 260—309.5 |

FOREIGN PATENTS

| 997,037 | 6/1965 | Great Britain | 260—309.5 |

OTHER REFERENCES

Hill et al.: J. Amer. Chem. Soc., vol. 44, p. 2362 relied on (1922).

Dains et al.: J. Amer. Chem. Soc., vol. 44, pp. 2310–15 (1922).

Sabata et al.: Chem. Abst., vol. 55, columns 4507–8 (1961).

Edman Acta Chem. Scand., vol. 4, pp. 277–82 (1950).

Hagenmaier et al.: Chem. Abst., vol. 73, No. 106188q (1970).

NATALIE TROUSOF, Primary Examiner

U.S. Cl. X.R.

71—92